Sept. 19, 1961   H. STEINBACH ET AL   3,001,024
MULTISWITCH OF THE CROSSBAR TYPE
Filed April 24, 1957   7 Sheets-Sheet 1

INVENTORS
H. STEINBACH —
J. BERNUTZ

BY

*Albert Peix*
ATTORNEY

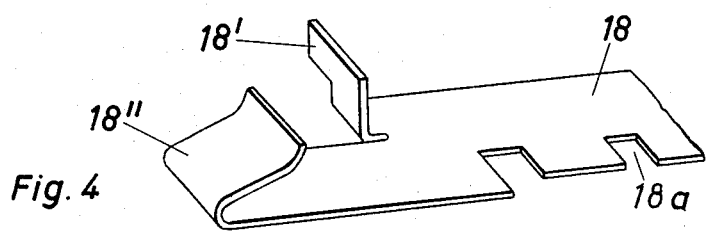
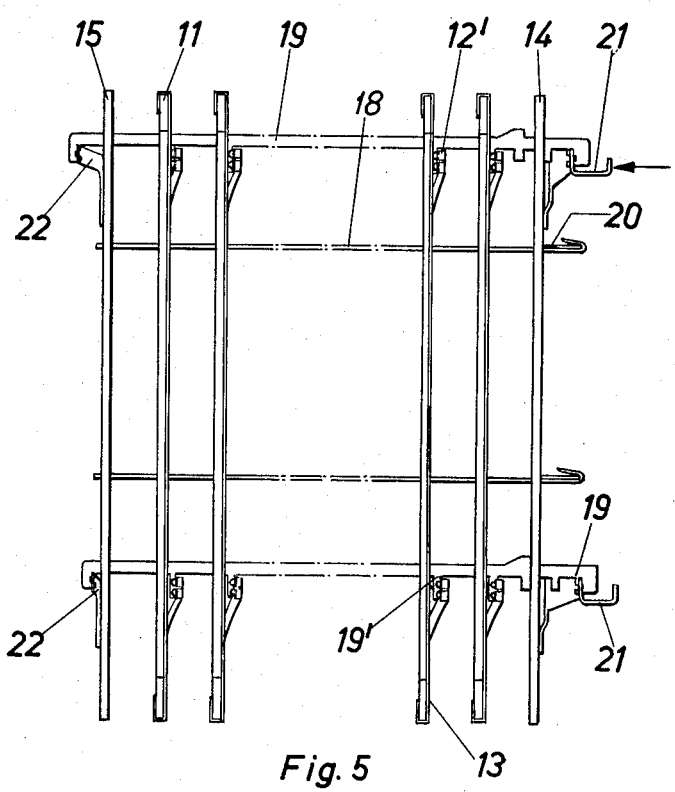

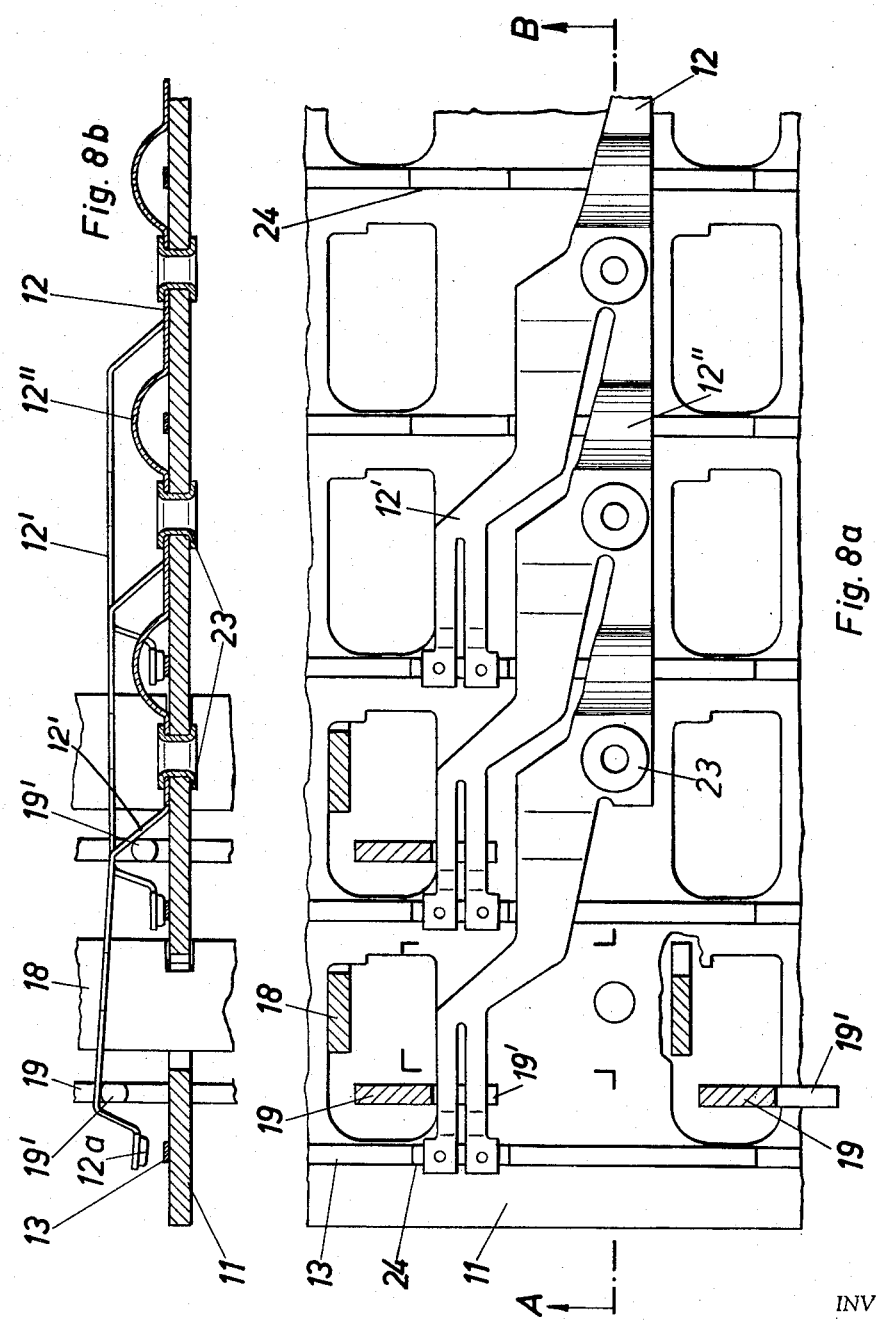

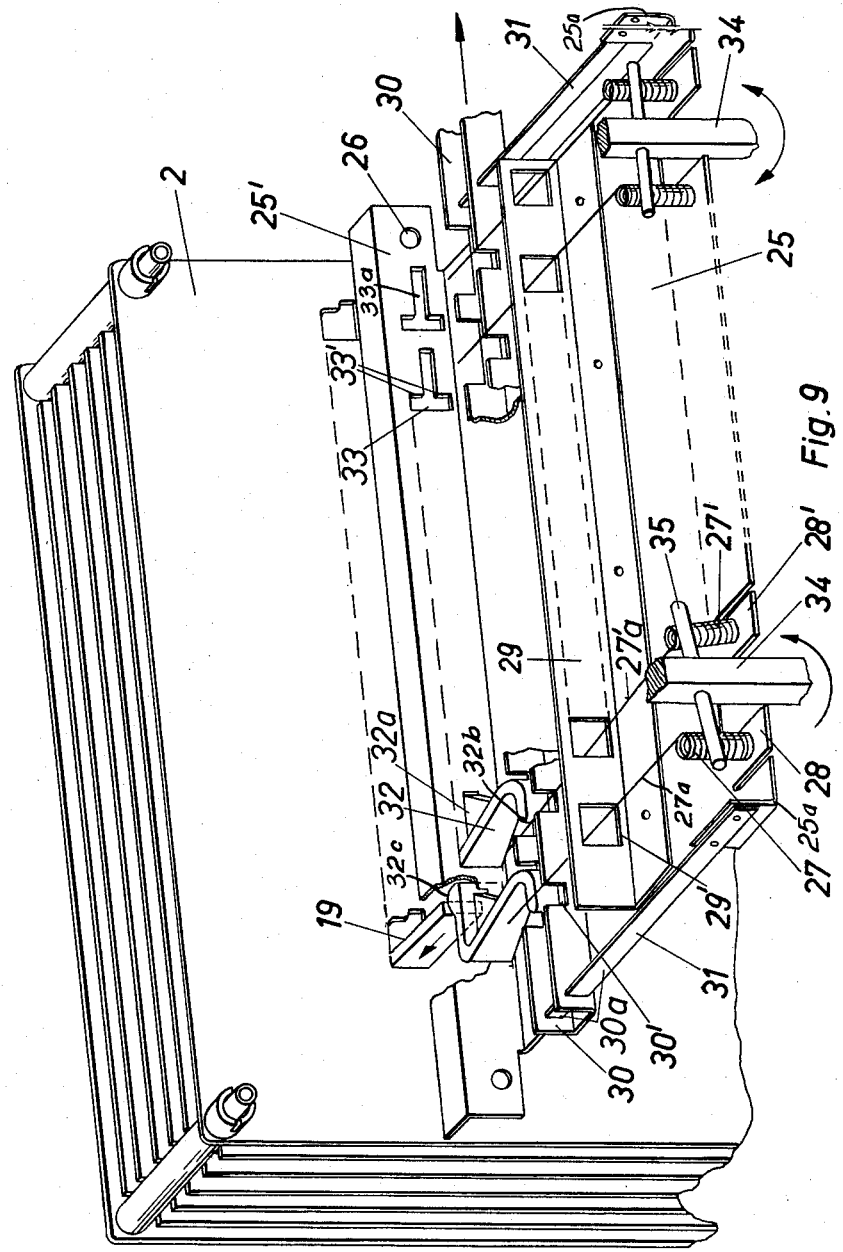

Sept. 19, 1961 H. STEINBACH ET AL 3,001,024
MULTISWITCH OF THE CROSSBAR TYPE
Filed April 24, 1957 7 Sheets-Sheet 7

INVENTORS
H. STEINBACH
J. BERNUTZ

BY

ATTORNEY

United States Patent Office 3,001,024
Patented Sept. 19, 1961

3,001,024
MULTISWITCH OF THE CROSSBAR TYPE
Heinz Steinbach, Kornwestheim, and Johannes Bernutz, Ludwigsburg-Hoheneck, Germany, assignors to International Standard Electric Corporation, New York, N.Y., a corporation of Delaware
Filed Apr. 24, 1957, Ser. No. 654,912
Claims priority, application Germany Apr. 28, 1956
8 Claims. (Cl. 179—27.54)

This invention relates to improvements in electrical switches and more particularly to a multiswitch of the crossbar type comprising marking means assigned in common to the individual switch units, further comprising connecting means assigned individually to the switch units, and comprising a multiple contact field without soldered joints, for the employment with telecommunication systems, in particular, telephone systems.

There are already known coordinate switches employing multiples without soldered joints, whose multicontact fields are staggered in depth in order to provide an economical solution as regards cost and space requirements. The contact springs of these multiples, when being actuated, act upon contact wires which are led through all of the individual switch units. Such an arrangement bears the disadvantage that the multiples are arranged in different planes and are embodied as separate structural elements so that after the assembly, the individual contacts which co-operate with the respective multiples have to be adjusted for assuring positive contact operation. Further disadvantage resides in the fact that, after removal of individual structural elements from the built-up switch which may be necessary after assembly or on account of a disturbance or trouble, the contacts have to be readjusted after the re-assembly of the structural elements.

In contrast to these conventional types of selectors and switches employing multiples without soldered joints, the invention is based on the problem of embodying the contact-making multiple field in such a manner that the crossing multiples are arranged in such a way that the contacting coordinate points can be readily checked prior to the assembly of the multiswitch, that is to say, before the individual switch units are combined to form a multiswitch. This is accomplished in that for the contact field of a multiswitch there are provided a number of plates of insulating material, lying in parallel planes, and arranged in close spaced relation to form a pile-up. On these plates of insulating material there are arranged coordinate multiples, consisting of multiconductors and contacting points of associating input and output leads, in a common plane. Thereby the multiples crossing each other are embodied in such a way that they can be readily mounted to their supports. A further advantage of an invention in the construction of the multiswitch resides in the fact that the entire contact-establishing multiple field can be easily separated from the remaining part of the switch by means of few manipulations carried out with the aid of plug-in connections. This means that a defective multiple can be replaced within a very short time by another replacement multiple.

The construction of the selecting elements makes possible a compact structure or arrangement of the switch. In this way a great number of individual switch units can be accommodated in a relatively small space. A feature of the invention resides in the fact that the selecting fingers are not mounted on movable selector rods as in conventional crossbar switches but are fixedly mounted to base plates which support the switch-actuating structure. By reason of the foregoing mounting, it is another feature of the invention to provide selector rods of small mass and requiring relatively small actuating magnets because no selector fingers are carried thereon and therefore little inertia need be overcome.

It is another feature of the invention to achieve short operating or selecting periods since the selector fingers are fixedly mounted on the base plate.

It is a further feature of the invention to provide a multi-contact field of space insulating cards carrying the coordinate conductors, the cards being arranged in a single unit.

It is a further feature of the invention to provide plug-on connectors to the respective sets of coordinate multiples.

The above-mentioned and other features and objects of this invention and the manner of attaining them will become more apparent and the invention itself will be best understood by reference to the following description of an embodiment of the invention taken in conjunction with the accompanying drawings, wherein:

FIG. 4 is a view of a portion of a holding strap for holding the several cards in spaced relation to each other and to the end mounting plates;

FIG. 5 is a side view of a portion of an assembled switch showing the details of the contact actuating mechanism;

FIG. 8a is a top sectional view of a portion of a card taken along the line A—B of FIG. 8b;

FIG. 8b is a schematic showing of a portion of one side of a card showing both sets of multiples, contacts and contact actuating elements;

FIG. 9 is a perspective partial view of the switch selecting and operating mechanism;

Figure 1:
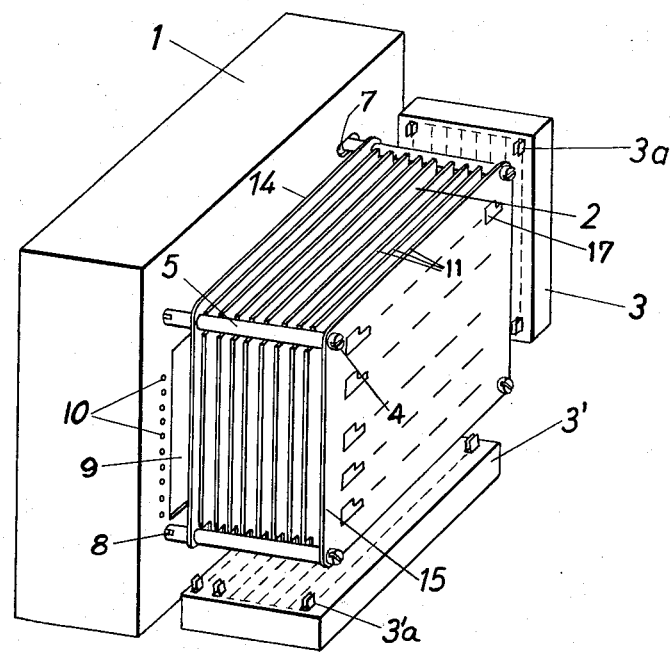
FIG. 1 is a schematic drawing in perspective showing the general assembly of a switch made according to the invention.
Figure 2:
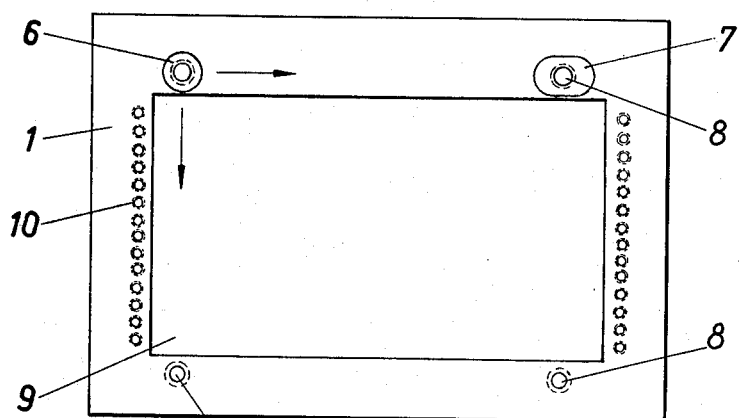
FIG. 2 is a schematic drawing of a mounting frame for supporting an assembled switch.

Referring now to FIG. 1 of the drawing, there is shown in perspective a supporting frame 1 formed in the shape of a hollow rectangular box and having a central rectangular window portion 9 cut out thereof. The window portion may be more readily appreciated from the view in FIG. 2. Adjacent opposite sides of the window portion 9, there are a series of spaced apertures 10, the purpose of which will be later explained. The frame 1 is provided with two apertures above the window 9, namely 6 and 7. The aperture 6 is circular but the aperture 7 is horizontally elongated, for a purpose to be later explained. Below the window portion 9, there are situated two additional apertures 8. Thus the apertures 6, 7 and 8 form a rectangle.

Figure 3:
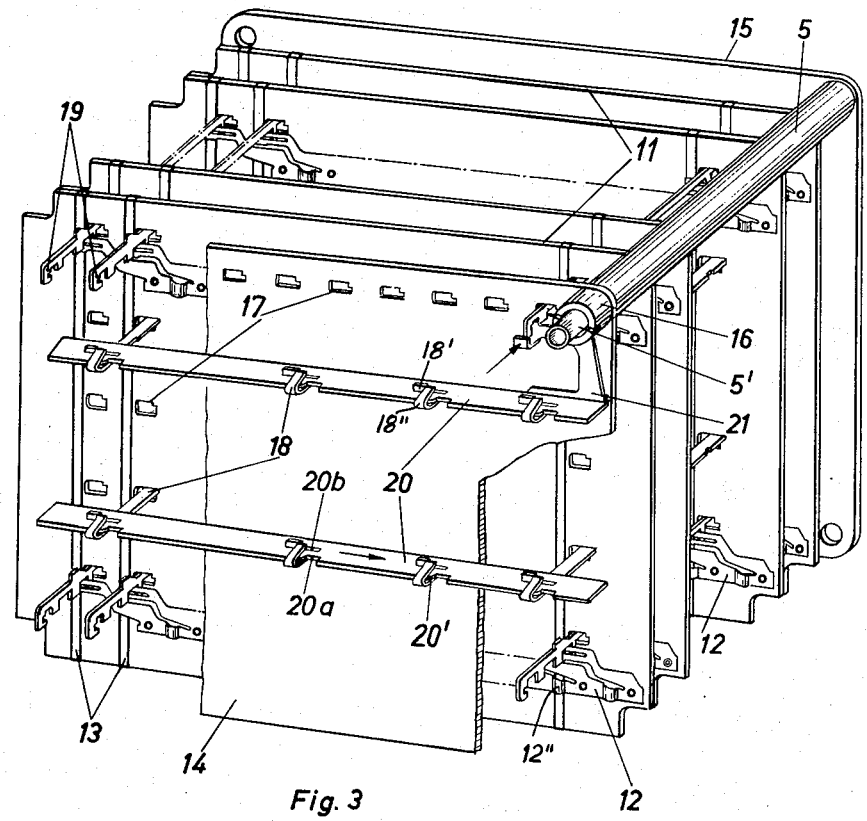
FIG. 3 is a perspective view of a portion of an assembled switch showing the details of assembly.
Figure 6:
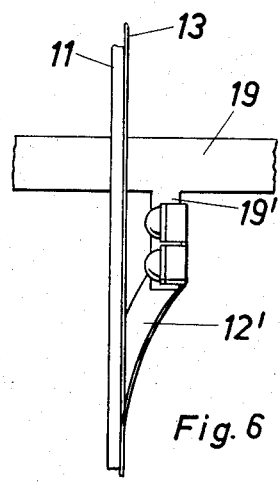
FIG. 6 is a schematic showing of a contact in the unoperated condition.

Referring again to FIG. 1, there is shown the multiple contact field 2 consisting of a plurality of similar cards 11 of electrical insulating material, each spaced from the other, said cards intermediate opposite spaced end plates 14 and 15. The plates 14 and 15 are maintained separated from each other by means of tubular bushings 5, as shown more clearly in FIG. 3 and through which bushings screws 4 may pass. The entire pile-up of cards and the plates are provided with series of spaced apertures 17 (shown in FIG. 3), each aperture in register with corresponding apertures in the other elements. A plurality of locking straps 18 are provided, each adapted to be inserted through a different row of apertures 17. Each of the straps 18 is provided with the series of spaced notches 18a along one edge thereof, as shown more clearly in FIG. 4. Each notch is adapted to grip a different card 11, as shown more clearly in FIG. 3. The locking straps 18 are provided with a hairpin shape end 18″ and an up-turned portion 18′. The end of the straps containing the portions 18′ and 18″ are intended to extend outside the plate 14, as shown in FIG. 3, and are intended to be locked into place by means of the locking bars 20, each bar of which is provided with a series of spaced slots 20a, one side of each slot having an inclined surface 20′. Each of the locking bars 20 is also provided with a series of spaced rectangular slots 20b. The upturned portion 18′ of the locking bars 18 is adapted to pass through the rectangular slots 20b of the locking bar 20 and the inclined surface 20′ of the bars is adapted to be urged against the turned over portion 18″, causing the locking straps 18 to be wedged against the outer surface of the plate 14. It will be seen from FIG. 5, that the straps 18 grip the outer plate 15 by means of the last tooth 18a in the bars 18 thus each of the cards 11 are maintained in spaced relation from the adjacent cards on either side thereof by virtue of the space between the teeth 18a in straps 18.

Referring back again to FIGS. 1 and 2, the pile-up is contained between the end plates 14 and 15 by means of the tip 5′ (shown in FIG. 3) which is adapted to be screwed over the end threads of the screw 4 that extends through the bushing 5. The tip 5′ may be threaded and it is of a diameter substantially similar to the diameter of the apertures 6 and 7 in the housing 1, and may be secured from the inside wall of the housing by means of suitable flanged nuts and washers. If desired, a diametric aperture may be made through the tip 5′ and a suitable pin (not shown) may serve to lock the tips 5′ into position with respect to the frame 1. The elongation of the slot 7 permits slight adjustment of the mounted pile-up 2, with respect to the frame 1.

As may be seen from FIG. 3, each card 11 is provided with spaced sets of coordinate multiple conductors. Each card is provided with a first set of spaced vertical conductors 13 and a second set of spaced horizontal conductors 12. Each of the horizontal conductors is provided with a bridge portion 12″ which arches over each of the vertical conductors 13. This feature may be seen more readily from FIG. 8b. The horizontal conductors 12 are provided with a series of contact portions 12′ which are bent outwardly from the surface of the cards 11 and provided with contact portions 12a. This feature may also be readily seen in FIG. 8b. Each of the vertical conductors 13 is provided with a coating of a precious metal 24 at points where contact is to be made by the associated contacts 12a. This coating may be readily seen in FIG. 8a.

The vertical multiples 13 may be applied to the cards 11 in any suitable manner including printed circuit technique by etching or by suitable fastenings extending through the cards 11. The horizontal conductors 12 may be fastened to the cards 11 by means of rivets 23 and which rivets may lie intermediate adjacent bridge portions 12″ of the conductor.

The movable contacts 12a are adapted to be controlled by protuberances 19′ carried on actuating elements 19, as shown in FIG. 8b. The contacts 12a are normally pretensioned by means of the bent-out portions 12′ so as to normally engage the associated vertical conductor 13.

Figure 7:
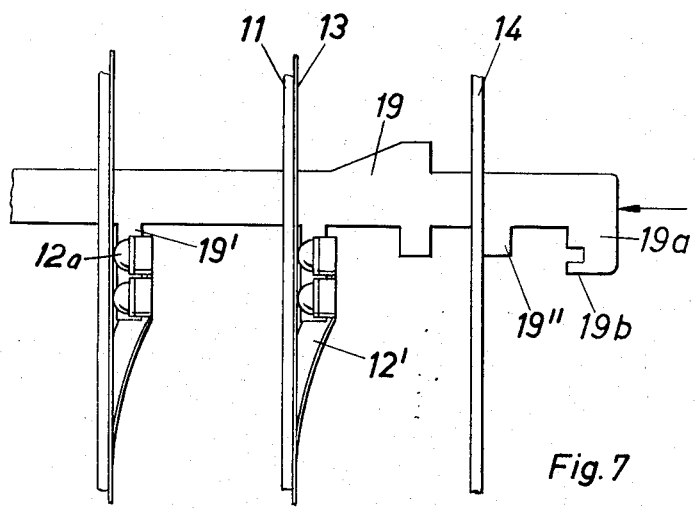
FIG. 7 is a schematic showing of two sets of contacts in the operated condition.

The profile of the actuating elements 19 may be readily appreciated from FIG. 7 wherein the protuberances 19′ are shown in operative association with the contacts 12a. The elements 19 are further provided with a stop 19″, which is adapted to abut against the outside surface of plate 14 upon application of a force indicated by the arrow in FIG. 7 and thus limits the movement thereof. The right-hand end portion of the element 19 is L shaped at 19a and is provided with an inside extending tooth 19b. Tooth 19b is adapted to extend through an aperture 21a of a spring element 21, whose general configuration may be seen from FIG. 9b. The spring 21 is provided with an off-set portion 21b which is attached to the outer surface of the plate 14 by any suitable means. The tension of spring 21 is normally in the right-hand direction when viewing FIG. 5 and against the tension of the spring 22 which is disposed on the outer surface of plate 15, as shown in FIG. 5. The profile of spring 21 is so chosen that the application of a force on the outside edge 21c thereof (which force is represented by the arrow in FIG. 5 and in the same direction) that the element 19 will move toward the left under the cumulative urging of the tension exerted by spring 22 and the several movable contact springs 12′ controlled thereby a distance sufficient to cause closure of contacts 12a with their associated vertical conductors 13. This distance is somewhat less than the distance required to cause tooth 19″ to abut against the plate 14. Continued pressure against the portion 21c of the spring 21 will cause no further movement of the element 19 but instead the spring 21 will take up the tension and the tooth 19b of the element 19 will tend to slide out of the aperture 21a in the spring 21. The length of the tooth 19b is such that it will not completely be disengaged from the aperture 21a. Upon removal of the force from the surface 21c of the spring 21, the said spring will cause the element 19 to be retracted in the right-hand direction against the tension of spring 22 and the cumulative tension of all the associated contact springs 12′.

Figure 9A:
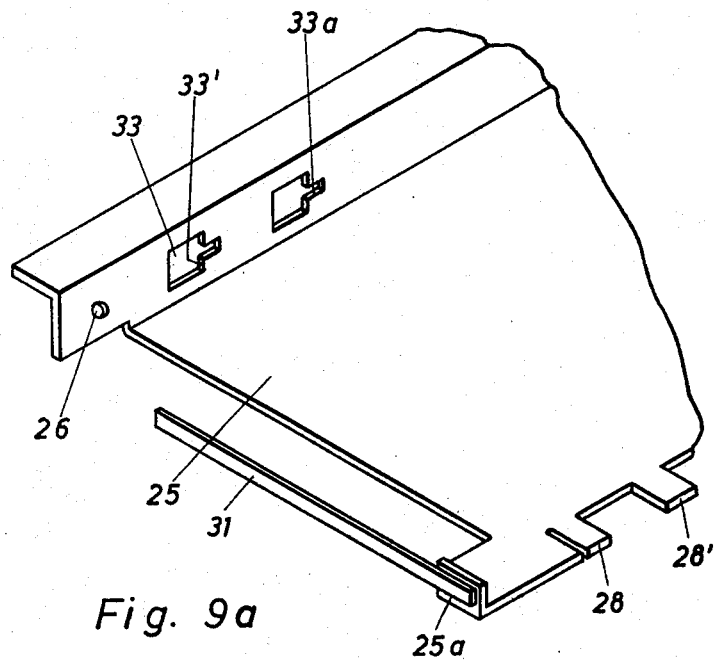
FIG. 9a is a schematic showing in perspective of the base plate which supports the mechanism of FIG. 9.
Figure 9B:
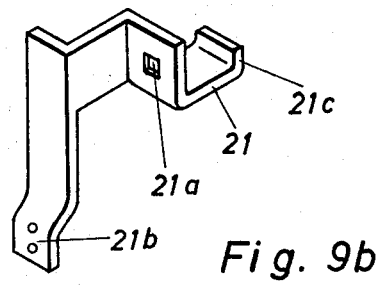
FIG. 9b is a showing in perspective of the details of a spring element used in conjunction with the contact actuating elements shown in FIGS. 3, 5 and 8.

The actuating structure of the switch will now be described with the aid of FIG. 9. Each level of the horizontal conductors is provided with its individual actuating mechanism of which a single level is shown in FIG. 9. Thus, if there are ten horizontal conductors 12 having ten sets of contacts 12a, there will be ten actuating mechanisms, each having ten actuating apparatuses under control of a single horizontal bar. Each actuating mechanism is contained on a base plate 25, seen more clearly in FIG. 9a. The base plate 25 is substantially Z shaped and is provided with a pair of apertures 26 at opposite ends thereof in the vertical portions of the Z structure. Suitable screws or other fastening devices are adapted to be passed through the apertures 26 into a pair of opposite apertures 10 in the frame shown in FIG. 1. The rear part of the frame 25 is provided with a pair of opposite turned-up portions 25a to which there are respectively affixed spring elements 31. Elements 31 are adapted to carry the horizontal bar 30 suspended thereon by means of apertures 30a, as shown in FIG. 9. Along the rear outer edge of the plate 25 there are a plurality of spaced tabs 28 and 28′ to each of which is attached a coiled mark spring 27 by any suitable means as by welding, etc. The free ends of the marking springs 27 are shaped into straight portions 27a and each extend through windows 29′ of an angle bar 29, mounted to plate 25 intermediate the front and rear portions thereof. The windows 29′ limit the movement of the straight portions 27a of the marking springs 27. Each straight portion 27a is adapted to be downwardly urged into a slot 30′ contained in the horizontal bar 30 and when depressed into said slot is caused to lie between the left-hand edge of slot 30′ and a redirecting angle element 32. The elements 32 are substantially S shaped and are provided with a horizontal web portion 32a. The redirecting angle elements 32 are adapted to pivot in the vertical slots 33 cut into the angle portion 25′ of the base plate against the edge 33′ thereof. The horizontal slot 33a of the apertures in 25′ are adapted to accommodate the web portion 32a of the angle elements 32, as seen in FIG. 9. Thus the elements 32 are supported in any position, whether actuated or not. The movement of the portion 27′a of the marking spring 27′ as shown in FIG. 9, causes the free end of said spring to be interposed between the end 32b of an angle element 32 and slot 30' of bar 30 so that upon movement toward the right of the horizontal bar 30 by a force indicated by the arrow, causes the marking spring to clutch the angle element 32 to the horizontal bar and cause it to move toward the right, thereby causing its opposite end portion 32c to abut against and longitudinally move actuating element 19 to cause the several contacts associated therewith to close.

It will be seen that the several marking springs 27 and 27' may be readily adjusted by means of the tabs 28 and 28' which may be moved up or down to properly direct the straight portion 27'a of each individual spring. There is provided for each pair of springs a select rod 34 which extends transverse of the several base plates and which select rods are adapted to be rotated in either direction. Extending outwardly perpendicular to the rods 34 are pairs of actuating bars 35, the opposite ends of each bar 35 adapted to cooperate with springs 27, 27' respectively. The operation is such that clockwise rotation of the select rod causes the actuating bar 35 to bend the marking spring 27 forward with the consequent downward movement of its straight portion 27a. Upon rotation in the opposite direction, the marking spring will spring back to normal position limited by the window 29' and only if the horizontal bar 30 has been returned to its left-hand or unoperated position. As the operating bar remains operated the friction exerted between the edge 30' of the slot in horizontal bar 30 and the end 32a of the redirecting angle bar 32, will cause the spring to remain in the operated position despite the movement of the associated select rod. The select rods may be rotated by any suitable mechanism known to those skilled in the art and similarly the horizontal rods 30 may be moved by similar means. Since such means are no part of this invention they are not further disclosed nor claimed. It will now be apparent that should a fault develop in any of the contacts of a pile-up 2, that the pile-up may be readily removed from the frame 1 without interfering with the operating mechanisms contained on the several base plates 25, which remain bolted to the frame as above explained. It will also be understood that counterclockwise rotation of rod 34 will result in the bending forward of the coil spring 27' with the consequent depression of its straight portion 27'a.

It will also be appreciated that relatively little force is required to rotate the select rods 34 since they do not carry the marking springs and, therefore, relatively little inertia need be overcome. Additionally, the fact that the marking springs 27, 27' are mounted on a fixed solid surface will tend to reduce the vibration thereof and render damping of the springs possible with a minimum of equipment.

As shown in FIG. 1, the horizontal conductors may be connected to an external circuit (further switches) by means of the terminal block 3 and which clips may clip on to the ends of the cards 11. A suitable conductor (not shown) may be connected to each clip 3a. A similar terminal block 3' is shown in FIG. 1 having similar clips 3'a each of which is adapted to clip on to the bottom of the cards 11 to make contact with the several vertical conductors 13 thereof. The clips 3'a are similarly connected to conductors (not shown) and connect to an external circuit.

While I have described above the principles of my invention in connection with specific apparatus, it is to be clearly understood that this description is made only by way of example and not as limitation to the scope of my invention as set forth in the objects thereof and in the accompanying claims.

What is claimed is:
1. A multiswitch of the crossbar type comprising a plurality of insulating cards arranged in spaced relation with one another, each card including a plurality of intersecting horizontal and vertical electrical conductor multiples mounted thereon in the same plane with each horizontal multiple including bridge means for electrically isolating it from the associated intersecting vertical multiples, contact means on each horizontal multiple for respective ones of the intersecting verticals, individual actuating means for each contact means for moving them from a first position to a second position to establish electrical contact between their associated horizontal multiple and their respective vertical multiple, common actuating means for each group of individual actuating means associated with any horizontal multiple, selecting means for mechanically linking any desired individual actuating means with the associated common actuating means, and means for operating the last-said common actuating means to cause the selected individual actuating means to move its associated contact means from its first position and its second position.

2. A multiswitch as claimed in claim 1 wherein the individual actuating means on any card are mechanically connected with respectively corresponding individual actuating means on all other cards.

3. A multi-switch as claimed in claim 2 wherein each horizontal multiple includes a plurality of laterally extending portions disposed in a plane parallel to the plane of its multiple and having said contact means secured thereon in overlying relation with respective ones of said intersecting vertical multiples.

4. A multi-switch as claimed in claim 2 wherein said mechanically connected individual actuating means comprises a bar extending traversely through corresponding apertures in all of said cards to engage corresponding contact means on each card.

5. A multi-switch as claimed in claim 4 wherein said selecting means comprises a marking spring mounted upon a fixed surface with respect to said switch, and means for moving said marking spring to mechanically link the said bar and said common actuating means.

6. A multi-switch as claimed in claim 5 wherein each of said marking springs comprises a helix having a first end thereof mounted on said fixed surface and a second end thereof comprising a straight portion tangentially extending therefrom.

7. A multi-switch as claimed in claim 5, further comprising marking spring movement-limiting means, said limiting means disposed intermediate said bar and said common actuating member.

8. A multi-switch as claimed in claim 5, wherein said means for moving said marking spring comprises a rotatable rod adjacent a pair of said marking springs, its longitudinal axis parallel to the axes of the helices of said springs, a pair of transverse rods extending perpendicularly from opposite sides of said rotatable rod, said transverse rods adapted to tilt their associated springs, respectively upon selective rotation of said rotatable rod.

References Cited in the file of this patent
UNITED STATES PATENTS

| | | |
|---|---|---|
| 2,166,764 | Matthies | July 18, 1939 |
| 2,399,962 | Vincent | May 7, 1946 |
| 2,509,416 | Blackhall | May 30, 1950 |
| 2,517,022 | Peek | Aug. 1, 1950 |
| 2,517,679 | Knos | Aug. 8, 1950 |

FOREIGN PATENTS

| | | |
|---|---|---|
| 924,217 | Germany | Feb. 28, 1955 |